United States Patent
Ito et al.

(10) Patent No.: US 7,336,891 B2
(45) Date of Patent: Feb. 26, 2008

(54) INFORMATION RECORDING APPARATUS AND METHOD FOR CONVERTING VIDEO INFORMATION

(75) Inventors: Masahiro Ito, Gyoda (JP); Hiroaki Unno, Kunitachi (JP); Hideo Kataoka, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1155 days.

(21) Appl. No.: 10/321,771

(22) Filed: Dec. 18, 2002

(65) Prior Publication Data

US 2003/0118330 A1    Jun. 26, 2003

(30) Foreign Application Priority Data

Dec. 26, 2001 (JP) ............................. 2001-395281

(51) Int. Cl.
*H04N 5/91* (2006.01)
(52) U.S. Cl. ........................................ 386/131; 386/95
(58) Field of Classification Search .................. 386/83, 386/89, 95, 112, 125, 126, 131; 369/275.03, 369/53.02
See application file for complete search history.

(56) References Cited

U.S. PATENT DOCUMENTS

| | | | | |
|---|---|---|---|---|
| 7,133,598 B1 * | 11/2006 | Lin et al. | ..................... | 386/109 |
| 7,194,193 B2 * | 3/2007 | Taira et al. | ..................... | 386/95 |
| 2003/0113097 A1 * | 6/2003 | Shibutani | ..................... | 386/52 |

FOREIGN PATENT DOCUMENTS

| | | | |
|---|---|---|---|
| DE | EP 1 195 767 | * | 4/2002 |
| EP | 1 256 949 A2 | | 11/2002 |
| EP | 1 422 710 A1 | | 5/2004 |
| JP | 11-45512 | | 2/1999 |
| JP | 11-250588 | | 9/1999 |
| JP | 11-288562 | | 10/1999 |
| JP | 2001-339687 | | 12/2001 |
| WO | WO 01/01415 A1 | | 1/2001 |

OTHER PUBLICATIONS

European Search Report dated Jan. 3, 2007 for Appln. No. 02026540.1-1522.

* cited by examiner

*Primary Examiner*—Thai Q. Tran
*Assistant Examiner*—Mitiku Debelie
(74) *Attorney, Agent, or Firm*—Pillsbury Winthrop Shaw Pittman, LLP

(57) ABSTRACT

An information recording apparatus for recording video information conforming to a first format comprises generation section for generating conversion compatibility information indicating the compatibility of conversion of video information conforming to the first format into video information conforming to a second format, and recording section for recording the video information conforming to the first format with the conversion compatibility information. The conversion compatibility information is typically contained in title information and it is possible to know the convertibility of the video information in advance on the basis of the conversion compatibility information.

6 Claims, 3 Drawing Sheets

Title information

| Resume |
| --- |
| Conversion compatibility information (or information on selection of recording restrictions) |
| Title |
| Recording time |
| Recording source information |
| Image quality rating |
| Sound quality rating |
| ⋮ |
| Recording time |

INFORMATION RECORDING APPARATUS AND METHOD FOR CONVERTING VIDEO INFORMATION

CROSS-REFERENCE TO RELATED APPLICATIONS

This application is based upon and claims the benefit of priority from the prior Japanese Patent Application No. 2001-395281, filed Dec. 26, 2001, the entire contents of which are incorporated herein by reference.

BACKGROUND OF THE INVENTION

1. Field of the Invention

This invention relates to an information recording apparatus adapted to convert video information conforming to the DVD-VR (Video-Recording) format into video information conforming to the DVD-Video format. More particularly, it relates to an information recording apparatus having a function feature of judging if the apparatus can convert given information or not.

2. Description of the Related Art

Recently, as DVDs (Digital Versatile Disks) have become commercially available, images recorded on disk are often re-recorded, edited and/or reproduced at an enhanced degree of frequency. For example, when recording an image by means of a DVD recording/reproducing apparatus, it is normally recorded conforming to the DVD-VR format image information recorded conforming to the DVD-Video format is normally replayed by means of a DVD player.

However, the image information recorded by means of a DVD recording/reproducing apparatus conforming to the DVD-VR format cannot be replayed by means of an ordinary DVD player. Therefore, if a user wants to replay a picture of a wedding ceremony recorded conforming to the DVD-VR format by means of a home use DVD player, the video information of the picture needs to be converted into video information conforming to the DVD-Video format.

When converting video information conforming to the DVD-VR format into video information conforming the DVD-Video format, firstly it is necessary to determine if the video attributes (including the aspect ratio and the number of pixels) and the audio attributes (including the recording mode such as AC3/LPCM and the sound mode such as stereo/mono/dual-mono) conform to the DVD-Video format for all the stream in order to carrying out the converting operation.

With any known method of converting image information conforming to the DVD-VR format into image information conforming to the DVD Video specifications for the purpose of dubbing video information conforming to the DVD-VR format on a DVD-R, DVD-R/W medium conforming to the DVD-Video format, it is necessary to check if the video/audio attributes of the original video information conform to the DVD-Video format for all the stream in order to carry out the dubbing operation. In other words, if the dubbing comes to a point where the video information is no good in terms of the format during an operation of writing video information on a DVD-R or DVD-R/W medium, the converting operation needs to be suspended at that point to waste the DVD-R or DVD-R/W medium. If the converting operation is conduced before the operation of writing video information on the DVD-R or DVD-R/W medium and a DVD-R write operation is started only when the compatibility is confirmed after the converting operation, the time required for preparing a finished DVD-R or DVD-R/W medium is equal to the time spent for the converting operation and the time spent for the write operation, which is nearly twice as long as the time necessary for the actual write operation and hence the overall operation is poorly efficient.

BRIEF SUMMARY OF THE INVENTION

In view of the above identified problem, it is therefore the embodiment of the present invention to provide an information recording apparatus adapted to determine if video information conforming to the DVD-VR Specification is converted into video information conforming to DVD-Video format or not easily in a short period of time and minimize the risk of failure due to video information that is no good in terms of the format during an operation of recording the video information on a DVD-R or DVD-R/W medium conforming to the DVD-Video format and also an information recording medium to be used with such a apparatus.

In an aspect of the invention, it is achieved by providing an information recording apparatus for recording video information conforming to a first format, the apparatus comprising: generation section which generates conversion compatibility information indicating the compatibility of conversion of video information conforming to the first format into video information conforming to a second format; and recording section which records the video information conforming to the first format with the conversion compatibility information generated by the generation section.

Thus, when an information recording apparatus according to the invention is operated to video information conforming to a first format, it judges if the video information can be converted into video information conforming to a second format in the future and records the result of its judgment as conversion compatibility information with the video information. While the conversion compatibility information is typically recorded as part of title information, it may alternatively be recorded anywhere else so long as the operation conforming to the first format is guaranteed to be normal. When video information conforming to the first format is converted into video information conforming to a second format, the conversion compatibility information is read out to determine if the conversion is feasible or not before actually recording the video information on a DVD-R or DVD-R/W main body. Therefore, it is no longer necessary to suspend a converting operation nor waste a long time for determining if the converting operation is feasible or not.

In another aspect of the invention, there is provided an information recording apparatus for recording video information conforming to a first format, the apparatus comprising: selection section which selects either a recording restriction mode of guaranteeing conversion of video information conforming to the first format into video information conforming to a second format or not; and recording which records the video information conforming to the first format with information on the selection of the selection section so long as the video information can be converted while being subjected to the recording restrictions.

Thus, in this aspect of the present invention, the selection-related information indicating that the video information is recorded while being subjected to the recording restrictions relating to the attributes of the video information in order to indicate if the video information is convertible or not in place of the above described conversion compatibility information along with the video information. Therefore, when the video information is converted, the selection-related information is read out and if the video is convertible or not is judged on the basis of the selection-related information so that the convertibility of the video information can be determined accurately in a short period of time.

DETAILED DESCRIPTION OF THE INVENTION

Now, the present invention will be described in greater detail by referring to the accompanying drawing that illustrates a preferred embodiment of the invention.

Figures 1, 3:
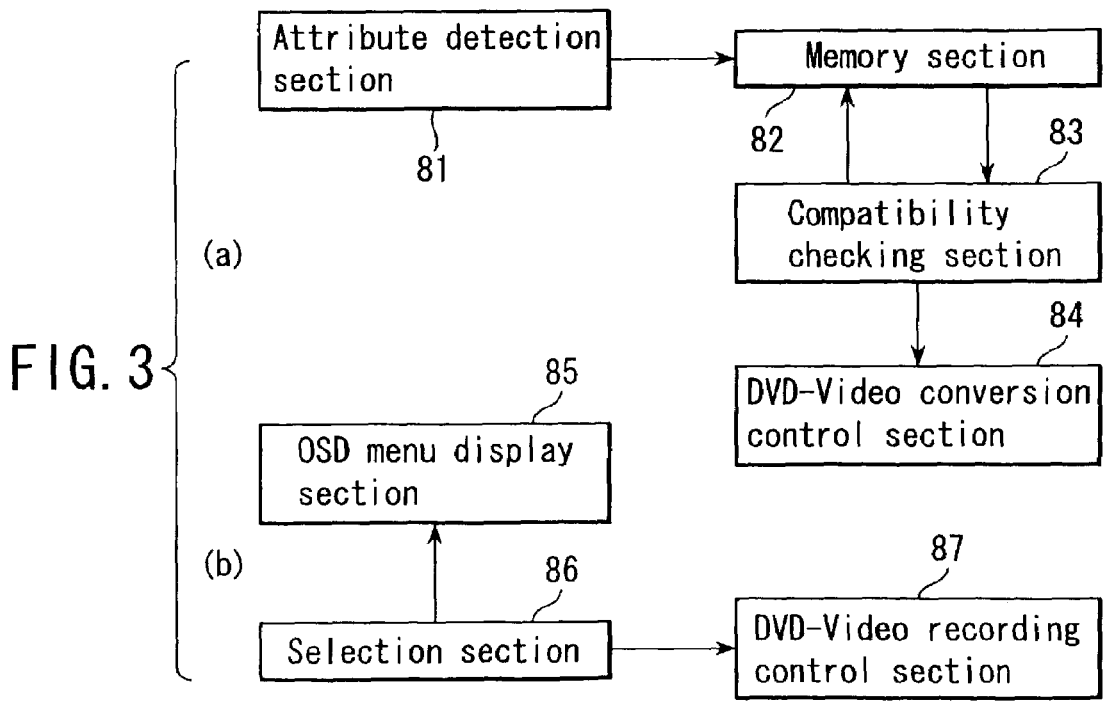
FIG. 1 is a schematic illustration of recorded title information containing conversion compatibility information and selection-related information that can be provided according to the invention.
FIG. 3 is a schematic illustration of a format conversion feature and an editing feature that can be provided according to the invention.
Figure 2:
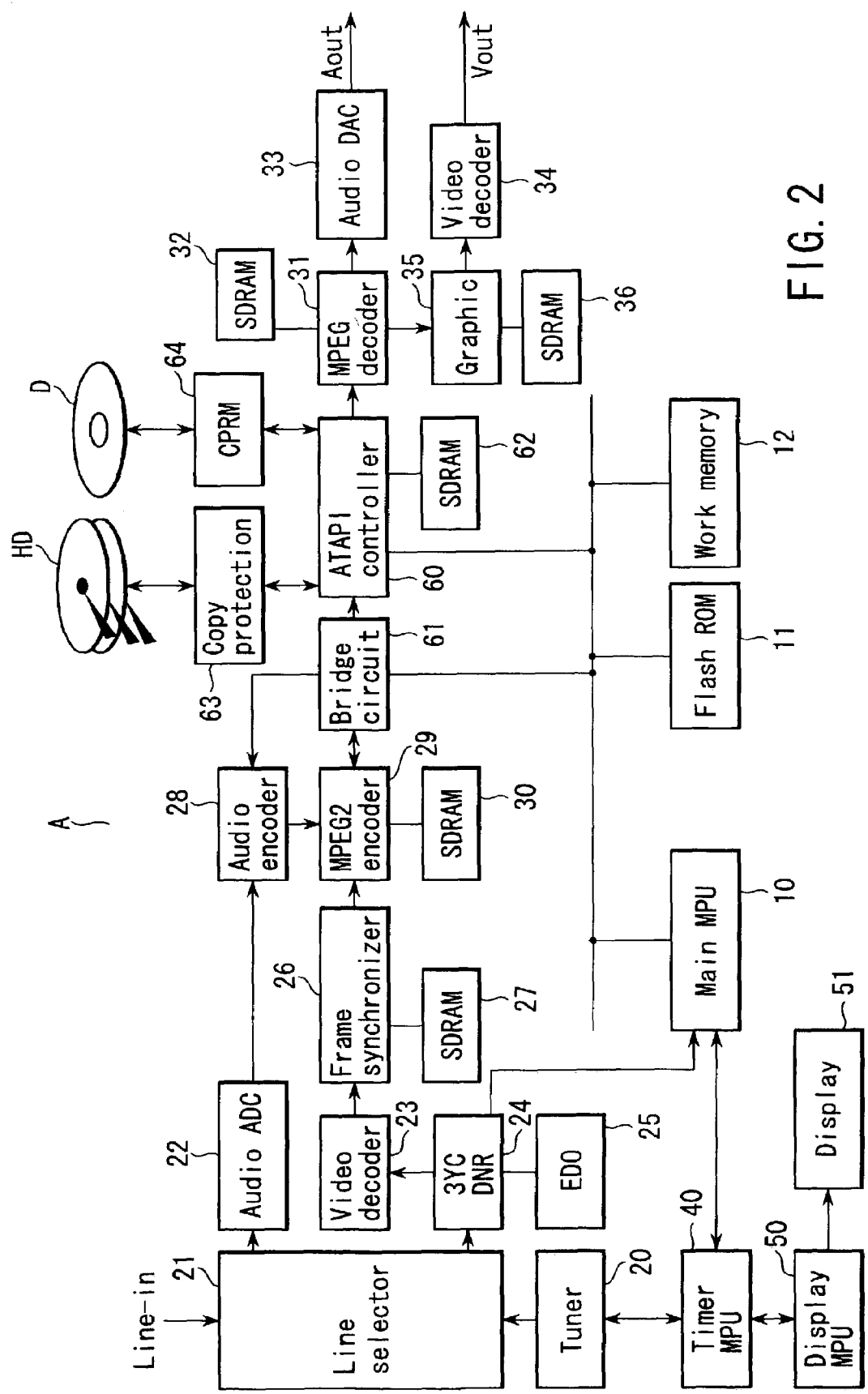
FIG. 2 is a schematic block diagram of an optical disk recording/reproducing apparatus according to the invention and having a format conversion feature and an editing feature.
Figure 4:
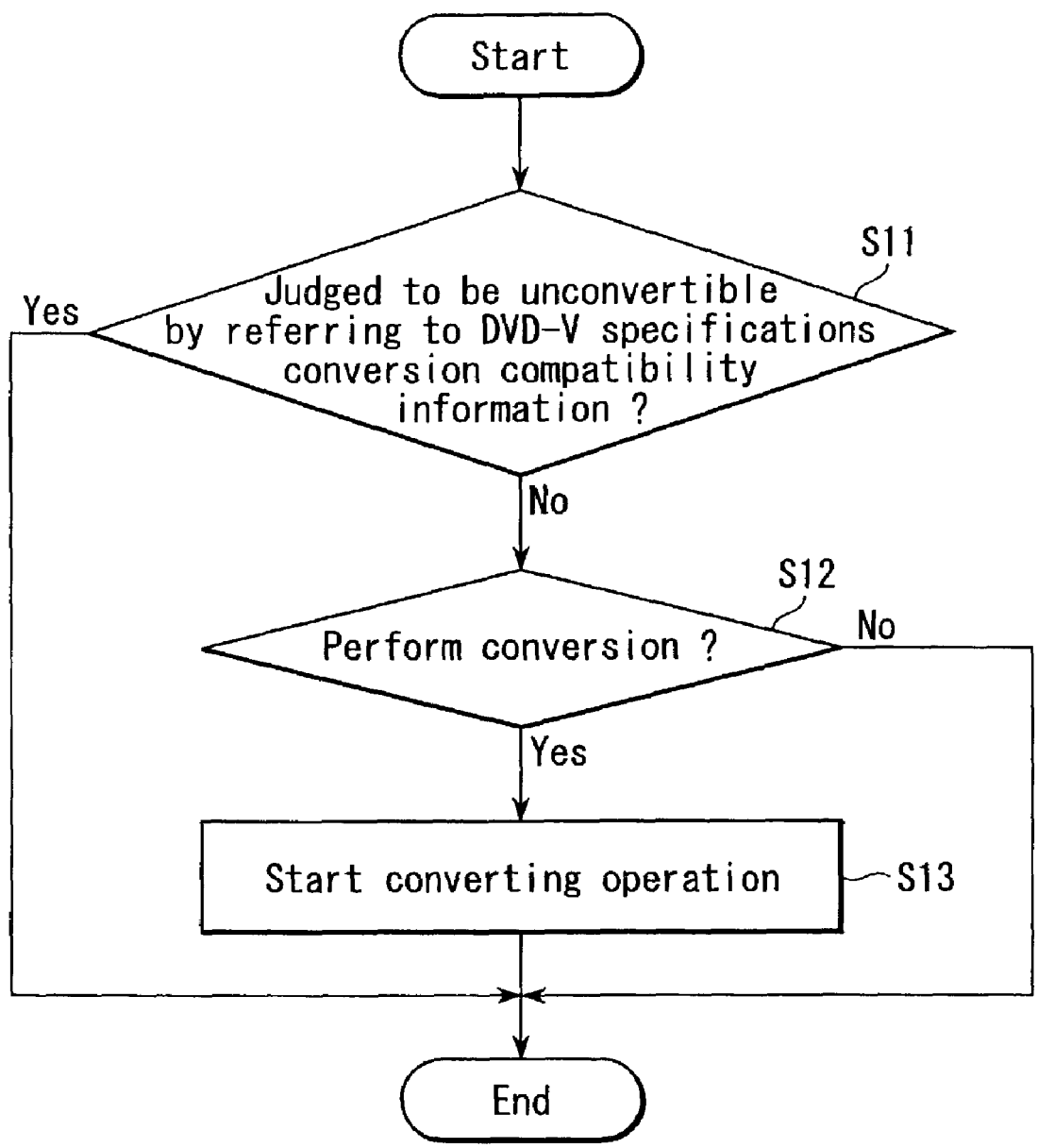
FIG. 4 is a flow chart of an operation of judging convertibility of information by referring to conversion compatibility information that can be carried out according to the invention.

FIG. 1 is a schematic illustration of recorded title information containing conversion compatibility information and selection-related information that can be provided according to the invention and FIG. 2 is a schematic block diagram of an optical disk recording/reproducing apparatus according to the invention and having a format conversion feature and an editing feature, whereas FIG. 3 is a schematic illustration of a format conversion feature and an editing feature that can be provided according to the invention and FIG. 4 is a flow chart of an operation of judging convertibility of information by referring to conversion compatibility information that can be carried out according to the invention.

<Exemplary Configuration of Optical Disk Recording/Reproducing Apparatus>

FIG. 2 is a schematic block diagram of an embodiment of optical disk recording/reproducing apparatus according to the invention and equipped with a functional feature of inter-specification conversion and that of editing. The overall operation of the optical disk recording/reproducing apparatus A is controlled by main MPU 10 by way of a data bus. The main MPU 10 is provided with a flash ROM 11 and a work memory 12. The apparatus comprises mainly for its functional feature of recording video information to a hard disk HD or an optical disk D, a line selector 21 provided with a tuner 20 and a line-in, an audio AD converter 22 to which signals are fed from the line selector 21, a video detector 23 to which video signals are supplied by way of 3YCDNR 24 provided with EDO 25 and a frame synchronizer 26 to which frame signals are supplied and which is provided with SDRAM 27. The apparatus additionally comprises an audio encoder 28 for encoding audio signals from the audio AD converter 22 and an MPEG2 encoder 29 adapted to receive video signals from the frame synchronizer 26 and perform an encoding processing operation on MPEG signals and provided with SDRAM 30. As means for storing video information, it also comprises a hard disk driver HD and an optical disk D connected to it respectively by way of copy protection 63 and CPRM 64.

The tuner 20 is controlled by timer MPU 40 for its operation. Similarly, display 51 is controlled by display MPU 50 under the control of the timer MPU 40.

As pointed out above, the apparatus further comprises for its functional feature of reproducing video information a hard disk driver HD connected to it by way of the copy protection 63 and an optical disk D connected to it by way of the CPRM 64. It additionally comprises an ATAPI controller 60 for processing the read out video signal, an MPEG decoder 31 which is provided with SDRAM 32 and adapted to decode the video signal supplied from the ATAPI controller 60, a graphic circuit 35 provided with SDRAM 36, a video decoder 34 to which the output of the graphic circuit 35 is supplied and which is adapted to decode video signals and an audio DA converter 33 adapted to convert the audio signal from the MPEG decoder 31. It further comprises a bridge circuit 61 that is controlled by the main MPU and adapted to operate as a circuit for intermediating the recording function and the reproducing function.

The format converting operation of the embodiment of optical disk recording/reproducing apparatus using conversion compatibility information and selection-related information for restricting recording will be described below. In FIG. 3, (a) schematically illustrates the format converting operation utilizing conversion compatibility information of the apparatus, whereas (b) schematically illustrates the format converting operation utilizing selection-related information. These operations are mainly performed by the main MPU 10, the flash ROM 11 and the work memory 12 of the optical disk recording/reproducing apparatus A.

<Utilization of Conversion Compatibility Information>

Conversion compatibility information that is specific to the present invention is judgment information, which makes it possible to judge in advance if given video information conforming to first format can be converted into video information conforming to DVD Video information when recording the video information conforming to DVD-VR format. An optical disk recording/reproducing apparatus according to the invention is adapted to record such conversion compatibility information typically in a memory region of an optical disk (or a hard disk or memory card) as part of title information as shown in FIG. 1 along with the video information.

(Generation and Recording of Conversion Compatibility Information)

When recording video information conforming to the DVD-VR format, the attribute detection means 81 judges if the video information can be converted into video information conforming to the DVD-Video format on the basis of the video attributes (aspect ratio and the number of pixels) and/or the audio attributes (stereo/mono/bilingual) and records the result of judgment, or the conversion compatibility information, as part of title information as shown in FIG. 1.

The conversion compatibility is judged in a manner as described below. The video information is judged to be convertible when the number of pixels is 720×480, or D1, as video attribute, whereas the video information is judged to be unconvertible when the number of pixels is 480×480, or half D1. As for the video attribute of aspect ratio, the video information is judged to be convertible when the aspect ratio of 16:9 and that of 4:3 do not coexist in a same title, whereas the video information is judged to be unconvertible when the aspect ratio of 16:9 and that of 4:3 coexist in a same title.

As for audio attributes, stereo and monaural are judged to be convertible, whereas bilingual, or dual mono, is judged to be unconvertible. Additionally, the sound is judged to be unconvertible when D1, D2 and LPCM coexist in a title.

Each of the attributes is judged by the attribute detection means 81 constituted by the main MPU 10 and the flash ROM 11 and the result of judgment, or the conversion compatibility information indicating the convertibility of the given piece of information into information conforming to the DVD-Video format, which may be represented by "1" for convertibility and by "0" for inconvertibility, is recorded in recording means 82, which may be an HD, along with the video information.

(Format Conversion and Recording Using Conversion Compatibility Information)

An operation of format conversion using the recorded conversion compatibility information is conducted in a manner as described below. FIG. 4 is a flow chart illustrating the sequence of an operation of format conversion that is performed by compatibility checking means 83 and DVD-Video conversion control means 84 as shown in (a) of FIG. 3.

Referring to FIG. 4, when converting the video information conforming to the DVD-VR format recorded on an optical disk into video information conforming to the DVD-Video format, the conversion compatibility information indicating the convertibility into video information conforming to the DVD-Video format as recorded in a memory means 82 such as an HD is read out by the compatibility checking means 83 that is driven to operate mainly by the program provided by the main MPU 10 and the flash ROM 11 and the converting operation is carried out when the conversion is judged to be not impossible (S11).

At this time, it may be appropriate to immediately start the operation of format conversion. However, it is also appropriate to generate an image signal and display an inquiry image on the display 51 to ask the user if he or she wants the conversion and prompt a corresponding operation on the part of the user. Then, the operation of format conversion is actually started when the user gives an order for carrying out the conversion (S12). If, on the other hand, it is judged that the conversion is impossible, a display signal for displaying that the conversion compatibility is nonexistent is generated.

It is also appropriate to check the second attribute of the video information while carrying out the converting operation. With this arrangement, if video information is judged at a time to be convertible on the basis of the conversion compatibility information stored with it but subsequently determined to contain an attribute that makes the video information unconvertible, the inconvertibility can be detected quickly.

Thus, an information recording/reproducing apparatus according to the invention can easily and quickly determine if video information conforming to the DVD-VR format can be converted into video information conforming to the DVD-Video format by utilizing the conversion compatibility information recorded in advance in a memory region and showing if the video information is convertible into video information conforming to the DVD-Video format or not without the need of checking all the stream of the recorded video information.

<Utilization of Selection-Related Information on Recording>

Now, utilization of the selection-related information on the recording restrictions in the optical disk recording/reproducing apparatus according to the invention will be described by referring to the accompanying drawing.

(Generation and Recording of Selection-Related Information)

The recording restrictions provided by taking format conversion into consideration are used to eliminate the attributes of video information that can obstruct the operation of converting video information conforming to the DVD-VR format into video information conforming to the DVD-Video format when recording the video information.

More specifically, in the case of a video attribute, a recording operation in a half DI mode that obstructs the converting operation is prohibited and a recording operation in a DI mode that allows the converting operation to proceed is conducted. In the case of an audio attribute, a recording operation in a bilingual mode that obstruct the converting operation is prohibited and the user is forced to select a main sound/auxiliary sound mode and the sound is converted into stereophonic sound for recording.

The recording restrictions are not always selected but OSD menu display means 85 mainly constituted by the main MPU 10 and the flash ROM 11 is controlled and the user is prompted to select the restrictions as part of the OSD menu. For example, an item to be selected such as "DVD-Video compatible=ON/OFF" may be displayed and the recording restrictions are imposed on the video information to be recorded conforming to the DVD-VR format so that it may conform to the DVD-Video format depending on the outcome of the user selection.

Then, the selection-related information, which may be represented by "1" for recording restrictions and by "0" for non-existence of recording restrictions, is recorded as a piece of title information as shown in FIG. 1 along with the video information.

(Format Conversion and Recording Using Selection-Related Information)

The recorded selection-related information on recording restrictions is utilized for an operation of format conversion in a manner as described below. In short, it is utilized by DVD-Video recording control means 87 on the basis of the selection-related information determined for utilization under the control of selection means 86.

For example, it is so arranged that an operation of format conversion is started unless the selection-related information that is recorded in the hard disk HD is read out with the video information and found to impose recording restrictions.

At this time, it may be appropriate to generate an image signal and display an inquiry image on the display to ask the user if he or she want to start the format conversion and prompt a corresponding operation on the part of the user.

Thus, an information recording/reproducing apparatus according to the invention is adapted to impose recording restrictions when it records a piece of video information conforming to the DVD-VR format so that it can easily and quickly carry out a subsequent operation of format conversion. Additionally, as the selection-related information indicating if the recording restrictions are selected or not is recorded in a recording region along with the video information, it is no longer necessary to consume a long period of time for checking the attributes of the video information so that the operation of format conversion can be carried out quickly and easily.

It is also appropriate to check the second attribute of the video information while carrying out the converting operation. With this arrangement, if a piece of video information is judged at a time to be convertible on the basis of the conversion compatibility information stored with it but subsequently determined to contain an attribute that makes the video information unconvertible, the inconvertibility can be detected quickly.

Those skilled in the art may be able to carry out the present invention by referring to the described above embodiments. Additionally, the above described embodiments may be modified or altered in various different ways without departing from the scope of the invention by those who are skilled in the art but do not have any particular ability of inventing the principle of the invention in a broad sense of the word. Thus, the present invention encompasses a broad scope that does not contradict the disclosed novel features of the invention and is by no means limited to the above described embodiments.

For example, the above embodiments are described mainly in terms of conversion of video information conforming to the DVD-VR format into video information conforming to the DVD-Video format by using mainly a DVD and a hard disk, the present invention provides similar effects for an operation of converting video information conforming a set of specifications into video information conforming another set of specifications within the scope of the invention. Thus, the above described techniques can improve the success ratio of converting operations and reduce the time required for each of the converting operations of converting digital video information into analog video information or vice versa, using various different recording mediums.

Thus, according to the invention, there is provided an information recording apparatus that can quickly and easily judge the convertibility of a given video information and quickly and reliably carry out an operation of format conversion without checking the entire stream of the recorded video information when the video information recorded conforming to the DVD-VR format is converted into video information conforming to the DVD-Video format.

What is claimed is:

1. An information recording apparatus for converting video information, said apparatus comprising:
a detection section configured to detect an attribute indicating whether a video signal conforming to a DVD-VR standard can be converted into a video signal conforming to a DVD-Video standard, based on the video signal conforming to the DVD-VR standard;
a generation section configured to generate, based on the detection result of the detection section, conversion compatibility information indicating whether the video signal conforming to the DVD-VR standard can be converted into the video signal conforming to the DVD-Video standard;
a recording section configured to record, as part of title information onto a memory area, the conversion compatibility information generated by the generation section, along with the video signal conforming to the DVD-VR standard;
a reading section configured to read, from the memory area, the video signal conforming to the DVD-VR standard, and the title information;
a determination section configured to determine whether the video signal conforming to the DVD-VR standard can be converted into the video signal conforming to the DVD-Video standard, based on the conversion compatibility information included in the title information read by the reading section from the memory area; and
a conversion section configured to convert the video signal conforming to the DVD-VR standard into the video signal conforming to the DVD-Video standard, when the determination section determines that the video signal conforming to the DVD-VR standard can be converted into the video signal conforming to the DVD-Video standard.

2. The information recording apparatus according to claim 1, wherein the detection section detects that the video signal conforming to the DVD-VR standard can be converted into the video signal conforming to the DVD-Video standard, when a video attribute indicates D1 corresponding to 720×480 pixels, and detects that the video signal conforming to the DVD-VR standard cannot be converted into the video signal conforming to the DVD-Video standard, when the video attribute indicates D2 corresponding to 480×480 pixels.

3. The information recording apparatus according to claim 1, wherein the detection section detects that the video signal conforming to the DVD-VR standard can be converted into the video signal conforming to the DVD-Video standard, when a video attribute indicates that an aspect ratio of 16:9 and an aspect ratio of 4:3 do not coexist in a single title, and detects that the video signal conforming to the DVD-VR standard cannot be converted into the video signal conforming to the DVD-Video standard, when the video attribute indicates that the aspect ratio of 16:9 and the aspect ratio of 4:3 coexist in the single title.

4. The information recording apparatus according to claim 1, wherein the detection section detects that the video signal conforming to the DVD-VR standard can be converted into the video signal conforming to the DVD-Video standard, when an audio attribute indicates a stereophonic or monophonic state, and detects that the video signal conforming to the DVD-VR standard cannot be converted into the video signal conforming to the DVD-Video standard, when the audio attribute indicates a bilingual or dual monophonic state.

5. The information recording apparatus according to claim 1, wherein the detection section detects that the video signal conforming to the DVD-VR standard cannot be converted into the video signal conforming to the DVD-Video standard, when D1, D2 and LPCM coexist in a single title.

6. A method for converting video information, said method comprising:
detecting an attribute indicating whether a video signal conforming to a DVD-VR standard can be converted into a video signal conforming to a DVD-Video standard, based on the video signal conforming to the DVD-VR standard;
generating, based on the detection result, conversion compatibility information indicating whether the video signal conforming to the DVD-VR standard can be converted into the video signal conforming to the DVD-Video standard;
recording, as part of title information onto a memory area, the conversion compatibility information generated by the generation section, along with the video signal conforming to the DVD-VR standard;
reading, from the memory area, the video signal conforming to the DVD-VR standard, and the title information;

determining whether the video signal conforming to the DVD-VR standard can be converted into the video signal conforming to the DVD-Video standard, based on the conversion compatibility information included in the title information read from the memory area; and converting the video signal conforming to the DVD-VR standard into the video signal conforming to the DVD-Video standard, when it is determined that the video signal conforming to the DVD-VR standard can be converted into the video signal conforming to the DVD-Video standard.

* * * * *